United States Patent [19]

Zannucci et al.

[11] 4,110,301

[45] Aug. 29, 1978

[54] POLYESTER FIBER DYE STABILIZATION

[75] Inventors: Joseph S. Zannucci; David G. Hedberg, Jr., both of Kingsport, Tenn.

[73] Assignee: Eastman Kodak Company, Rochester, N.Y.

[21] Appl. No.: 709,680

[22] Filed: Jul. 29, 1976

[51] Int. Cl.$^2$ ................................................ C08K 5/10
[52] U.S. Cl. ............................ 260/40 P; 260/45.85 B
[58] Field of Search ........................ 260/45.85 B, 40 P

[56] References Cited

U.S. PATENT DOCUMENTS

| | | | |
|---|---|---|---|
| 2,464,250 | 3/1949 | Mall et al. ...................... | 260/45.85 B |
| 2,901,466 | 8/1959 | Kibler et al. ..................... | 260/75 R |
| 3,342,850 | 9/1967 | Newland et al. .............. | 260/45.85 B |
| 3,424,716 | 1/1969 | Nashay et al. ................. | 260/45.85 B |
| 3,546,161 | 12/1970 | Wolheim ..................... | 260/45.85 B |
| 4,038,250 | 7/1977 | Lind ............................... | 260/45.85 B |

*Primary Examiner*—Sandra M. Person
*Attorney, Agent, or Firm*—Donald W. Spurrell; Daniel B. Reece, III

[57] ABSTRACT

Disclosed are textile polymers and dyed fibers comprised of poly(1,4-cyclohexylenedimethylene terephthalate) type polyester, which may be modified with poly(oxyethylene glycol) and further with isophthalic acid and 5-sodiosulfoisophthalic acid, and containing certain compounds which rearrange and markedly improve the fastness of the dye upon exposure to light.

4 Claims, No Drawings

POLYESTER FIBER DYE STABILIZATION

This invention relates to textile polymer and fibers comprised of poly(1,4-cyclohexylenedimethylene terephthalate) type polyester, which may be modified with poly(oxyethylene glycol) and further with isophthalic acid and 5-sodiosulfoisophthalic acid. The fiber contains certain compounds which photo-rearrange to their corresponding ketones and markedly improve dye lightfastness upon exposure to light. Other materials such as phosphorus, various stabilizers, and catalyst residues such as manganous ion may also be present.

The fiber polymer of the present invention may be the polyester from terephthalic acid and 1,4-cyclohexanedimethanol, and may contain from 3 to 12 percent, by weight, based on the weight of the polymer, of poly(oxyethylene)glycol having a molecular weight in the range from about 300 to about 1500, preferably 300 to 800. These polymers have inherent viscosities of at least 0.4, and preferably from 0.6 to about 1.0, measured at 25° C. using 0.5 grams of polymer per 100 ml. of 60/40 by volume of phenol to tetrachloroethane. The polyester also may be modified with a range of, for example, 5 to 15 mole percent of isophthalic acid, and from about 0.5 to about 5 mole percent of 5-sodiosulfoisophthalic acid, based on total moles of acid component. The terms "acid", "glycol", and the like, as used herein, include the various chemical equivalents such as anhydrides and esters commonly employed in polyester synthesis.

The polyetherester is typically prepared as described in the examples below and in copending U.S. Ser. No. 664,841 filed March 8, 1976, Ser. No. 583,950 filed June 4, 1975, and U.S. Pat No. 2,901,466, using the poly(oxyethylene)glycol as a modifier as described in Textile Res. J., 29, 536 (1959) Charch and Shivers.

The photo-rearrangeable compounds useful in the present invention have the formula

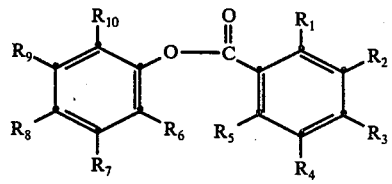

wherein $R_1$–$R_{10}$ may be the same or different and selected from straight or branched alkyl or alkoxy of 1–6 carbons, hydrogen, and hydroxyl, and in all cases either $R_6$ or $R_{10}$ must be hydrogen. Preferred are the compounds of the formulae.

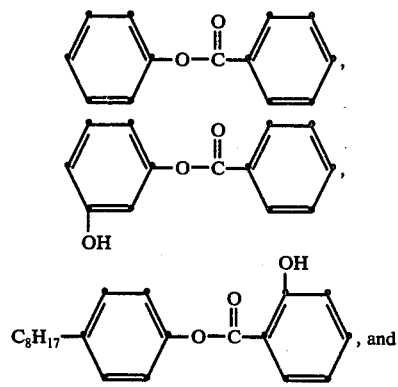

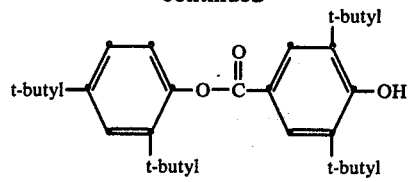

The rearrangeable compounds are typically added to the polymer by absorption from the dyebath and also, particularly in the case of the most preferred compound, resorcinol monobenzoate (RMB), by coating the polymer granules therewith before spinning. These compounds may be used in the dye bath or as a precoating on the polymer in concentrations of from about 0.01 to about 5.0 weight percent (0.25 to about 2.0 weight percent being preferred) based on the weight of the polymer.

The dyes useful in the present invention are the cationic and disperse dyes defined in the Color Index, and such as those more particularly described in U.S. Pat. Nos. 3,390,948; 3,816,392; 3,765,830; and 3,763,141. Exemplary types of useful dyes are

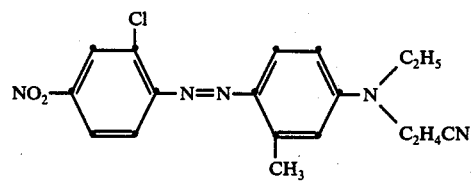

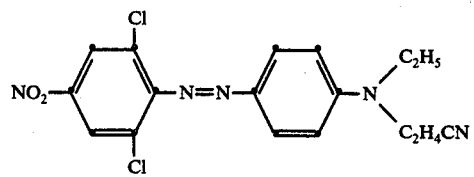

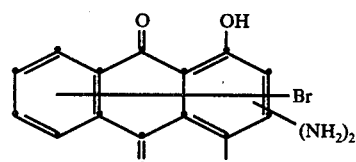

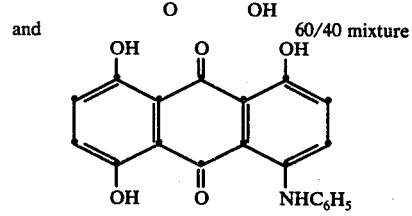

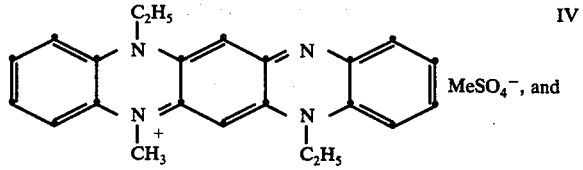

The polymer may also contain other materials, and, in particular, based on the weight of the polyetherester, up to about 0.015% of manganese in the form of a salt such as formate, acetate, propionate, and benzoate, which may result from its use as a catalyst component; up to about 0.05% of phosphorus which may be derived from the phosphorus compounds described below; and a stabilizing amount, usually up to about 1.0%, of antioxidant effective to reduce oxidative degradation of the polymer.

The phosphorus compound, when employed as a stabilizer, is in a concentration sufficient to give from about 20 to about 500 parts per million of phosphorus based on polymer weight, and may be added in known manner during polymer manufacture, just prior to spinning, or diffused into the fiber before heat setting, and may be in any oxidation state and in any of a large variety of compounds, including, for example, phosphorous acid, phosphoric acid, pyrophosphoric acid, polyphosphoric acid, phosphates, phosphites, and phosphonates.

Antioxidants typically employed in polymers may also be used with the present invention and include the relatively nonvolatile hindered phenolic compounds such as 1,3,5-trimethyl-2,4,6-tris(3,5-di-tert-butyl-4-hydroxybenzyl)benzene; tris(3,5-di-tert-butyl-4-hydroxyphenyl) phosphate; and dioctadecyl 3,5-di-tert-butyl-4-hydroxybenzyl phosphonate. A preferred antioxidant is pentaerythritol tetrakis[3-(3,5-tert-butyl-4-hydroxyphenyl)]-propionate.

Preparations of polymer and fiber are given below wherein parts per million (ppm) are based on total parts of polymer reactants. The manner in which the rearrangeable stabilizer compounds were added to the system is footnoted in the tables.

EXAMPLE 1

The following materials are placed in a 500 ml. reaction flask:
- 116.4 g. (0.60 mole) dimethyl terephthalate
- 17.82 g. (0.0297 mole) poly(oxyethylene glycol) 600 molecular weight
- 106.8 g. (0.742 mole) 1,4-cyclohexanedimethanol
- 40 ppm. Mn as $Mn(C_2H_3O_2)_2 \cdot 4H_2O$
- 80 ppm. Ti as acetyl triisopropyl titanate
- 30 ppm. P as any of the aforesaid compounds The flask if fitted with a nitrogen inlet, an outlet for downward distillation, and a metal stirrer. A slow nitrogen sweep is started and the flask is placed in a metal bath controlled at 220° C. After stirring 0.5 hours under these conditions with removal of methanol, the temperature is increased to 290° C. and after 30 minutes at this temperature the reaction flask is placed under vacuum. The mixture is stirred 1.5 hours at 290°–296° C. under a vacuum of <0.5 mm. Hg., the reaction mixture cooled to room temperature, the product polymer ground to pass a 3-mm. screen and typically has an inherent viscosity of 0.66.

The polymer is melt spun into fibers at 295°–305° C. and a pressure of 600 psi. The fibers are drafted at a draft ratio of 1:2.5 to 1:4.5, and preferably contain about 30 weight parts per million of phosphorus derived from an admixture of equal moles of a compound corresponding to the formula

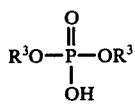

and a compound corresponding to the formula

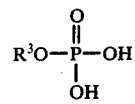

where $R^3$ is lauryl. The fibers typically have a denier of 16.5, tenacity of 2.06 g./den., elongation of 33%, and elastic modulus of 28.2 g./den.

EXAMPLE 2

The following materials are placed in a 500-ml. reaction flask:
- 85.36 g. (0.44 mole) dimethyl terephthalate
- 9.7 g. (0.05 mole) dimethyl isophthalate
- 4.35 g. (0.01 mole) dimethyl 5-sodiosulfoisophthalate
- 12.6 g. (0.021 mole) poly(oxyethylene glycol) 600 molecular weight
- 90.7 g. (0.629 mole) 1,4-cyclohexanedimethanol
- 80 ppm. Ti as acetyl triisopropyl titanate The flask is fitted with a nitrogen inlet, an outlet for downward distillation, and a metal stirrer. A slow nitrogen sweep is started and the flask is placed in a metal bath controlled at 200° C. After stirring 0.5 hour under these conditions with removal of methanol, the controller setting is increased to 295° C. and after an additional 30 minutes the reaction flask is placed under vacuum. The mixture is stirred 1.5 hours at 295°–296° C. under a vacuum of <0.5 mm. Hg. The reaction mixture is cooled to room temperature, the product polymer ground to pass a 3-mm. screen and typically has an inherent viscosity of 0.78.

This polymer is melt spun into fibers, the fibers are drafted, and the drafted fibers provided as in Example 1 with phosphorus. The properties of the fibers typically are: denier: 20, tenacity: 2.07 g./den., elongation: 62%, and elastic modulus: 23.5 g./den.

EXAMPLE 3

Batting of the fiber of Example 1 is scoured for 20 minutes at 80° C. with a solution of 1 g./liter each of tetrasodium pyrophosphate and soap. A 5 gram sample of this fabric is then refluxed for 1 hour in a mixture of 150 ml. water, 50 mg. monosodium phosphate, 50 mg. Calgon, and 0.005 g. of dye III. The fabric is then scoured for 20 minutes at 80° C. with 150 ml. of a solution of 1 g./liter each of sodium carbonate and soap. The fabric is dried at 250° F. and then exposed to light in an Atlas Fade-Ometer for 60 hours. Color differences are determined at 600-nm. with a reflectance spectrophotometer. The results are given in Tables 1 and 2.

Table 1

| Additive[1] | % Dye Loss In 60 Hr. Exposure[2] |
|---|---|
| Control (No additive) | 24 |
| 2,4-di-t-butylphenyl-3,5-di-t-butyl-4-hydroxybenzoate | 15 |
| Resorcinol dibenzoate | 17 |
| RMB | 5 |
| OPS (octylphenylsalicylate) | 5 |

[1]Additives were in the dyebath at 1.0% by weight concentration, based on weight of fabric.
[2]Dyes were exposed in an Atlas carbon-arc Fade-Ometer.

Table 2

| Additive[1] % | % Dye Loss in 60 Hr. Exposure[2] |
|---|---|
| Control (No additive) | 19 |

Table 2-continued

| Additive[1] % | % Dye Loss in 60 Hr. Exposure[2] |
| --- | --- |
| RMB | 2 |

[1]Additive was coated at 1.0% by weight onto the polymer granules before spinning.
[2]Dyes were exposed in an Atlas carbon-arc Fade-Ometer.

EXAMPLE 4

Batting of the fiber of Example 2 is dyed with dye IV as in Example 3 at a pH of about 4 and tested as shown in Table 3.

Table 3

| Additive[1] % | % Dye Loss in 20 Hr. Exposure[2] |
| --- | --- |
| Control (No additive) | 16 |
| RMB | 9 |

[1]The additive was in the dyebath at 1.0% by weight concentration based on weight of fabric.
[2]Dyes were exposed to Xenon arc fitted with Pyrex filters.

EXAMPLE 5

Granules (150 g.) of poly(1,4-cyclohexylenedimethylene terephthalate) are slurried with 200 ml. of toluene containing 1.5 g. of RMB. After removal of the toluene on a steam bath, the granules are dried overnight at 108° C. The granules are spun into filaments (15 den./filament) and the filaments woven into a knit tube. The knit tube is dyed with 0.1% of dye V and exposed as in the example 3. The results are given in Table 4.

Table 4

| Additive[1] | % Dye Loss in 20 Hr. Exposure |
| --- | --- |
| Control (No additive) | 11 |
| RMB | 5 |

[1]Additive at 1.0% by weight was coated onto polymer granules before spinning.

The above data show that the rearrangeable esters of this invention perform extremely well in minimizing degradation and loss of dye. It is reiterated that these esters are useful with a wide scope of dyes and the invention is not limited by dye type.

The invention has been described in detail with particular reference to certain preferred embodiments thereof, but it will be understood that variations and modifications can be effected within the spirit and scope of the invention.

We claim:

1. The composition comprising poly(1,4-cyclohexlenedimethylene terephthalate) containing one or more of from about 3–12 weight percent based on total polymer weight of poly(oxyethylene glycol) having a molecular weight of from about 300 to about 800, from about 5 to about 15 mole percent of isophthalic acid and from about 0.5 to about 5.0 mole percent of 5-sodiosulfoisophthalic acid based on total acid moles, blended with from about 0.01 to about 5.0% by weight based on total polymer weight of one or more rearrangeable compounds of the formula

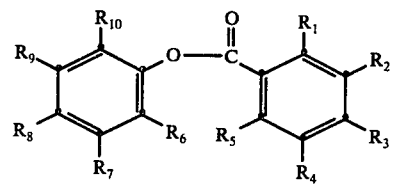

where $R_1$–$R_{10}$ may be the same or different and selected from straight or branched alkyl or alkoxy of 1–6 carbons, hydrogen, and hydroxyl, and in all cases either $R_6$ or $R_{10}$ must be hydrogen.

2. The composition of claim 1 in the form of a fiber.

3. The fiber of claim 2 containing a disperse dye.

4. The fiber of claim 3 wherein the compound is present in a concentration of from 0.25 to 2.0% by weight and is selected from

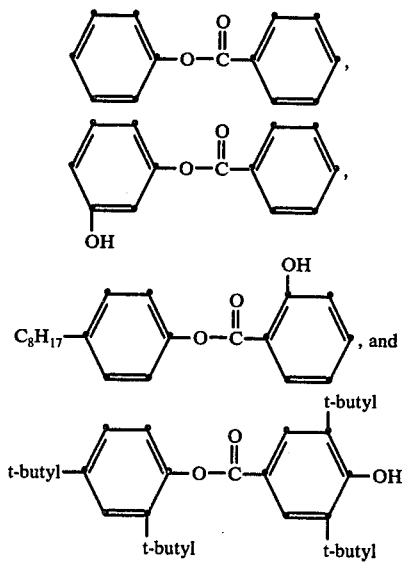

* * * * *